No. 883,048. PATENTED MAR. 24, 1908.
E. A. PFLUEGER.
SINKER FOR FISHING TACKLE.
APPLICATION FILED OCT. 26, 1907.
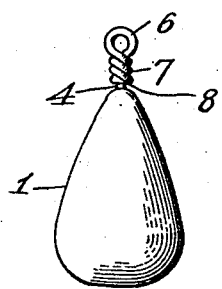
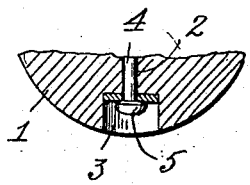
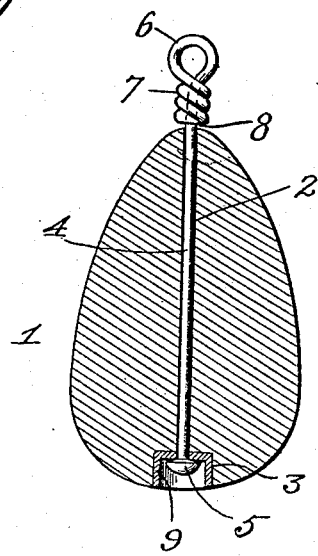
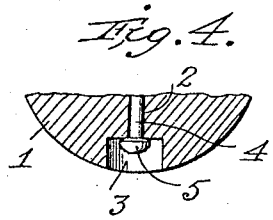
Witnesses
Edwin L. Yewell
G. M. Copenhaver
Inventor
Ernest A. Pflueger
by Percy B. Hills
Attorney

UNITED STATES PATENT OFFICE.

ERNEST A. PFLUEGER, OF AKRON, OHIO, ASSIGNOR TO THE E. A. PFLUEGER COMPANY, OF AKRON, OHIO, A CORPORATION OF OHIO.

SINKER FOR FISHING-TACKLE.

No. 883,048.

Specification of Letters Patent.

Patented March 24, 1908.

Application filed October 26, 1907. Serial No. 399,256.

*To all whom it may concern:*

Be it known that I, ERNEST A. PFLUEGER, a citizen of the United States, residing at Akron, in the county of Summit, State of Ohio, have invented new and useful Improvements in Sinkers for Fishing-Tackle, of which the following is a specification.

My invention relates to sinkers for fishing tackle, and has for its object to provide an improved construction of swiveled sinker, as will be hereinafter more definitely pointed out and claimed, reference being had to the accompanying drawing, in which:

Figure 1 is a side elevation of my improved device. Fig. 2 is an enlarged central vertical sectional view of the same. Figs. 3 and 4 are views similar to Fig. 2 of the lower end of the sinker, illustrating modified constructions.

Similar numerals of reference denote corresponding parts in the two views.

In the said drawing the reference numeral 1 denotes the body of my improved sinker, composed of lead or other suitable metal, and formed, by casting or otherwise, preferably egg-shaped, and with a central longitudinal aperture 2 therethrough, terminating at its lower end in an enlarged recess or chamber 3. Passed through said aperture 2 is a wire shank 4, headed at 5 at its lower end to limit the movement therethrough, said headed end 5 lying in the recess or chamber 3, as shown. When so inserted, the upper free end of said wire shank is formed into a loop 6, and then coiled upon itself at 7 almost to the body 1, thus positioning said wire shank 4 in the body 1, and, while preventing longitudinal movement of the former, yet permitting the free rotation of the body 1 thereon. The free end of wire shank 4 I bring to a point at 8, so that, when coiled, the lower portion of said coil will form a smooth bearing for the upper end of the body 1, as shown.

In connection with the headed end 5 of wire shank 4 I prefer to employ a flanged washer 9 fitted accurately in the recess or chamber 3, the edge of said flange lying flush with outer surface of the body 1. Said washer, which is preferably formed of hard metal, will thus not only take the wear of the headed end 5 of wire shank 4, due to the rotation of body 1, but will also effectually protect the soft metal edge of recess or chamber 3 and will prevent the latter from becoming upset, due to blows. I may, however, employ a flat unflanged washer within the recess or chamber 3, as shown in Fig. 3 or may even dispense with said washer as shown in Fig. 4.

The advantages of my improved construction are, first, that the body 1 may be separately cast, and, secondly, that, when assembled and in use, no projecting parts at the lower end of the sinker are provided to tangle with weeds or other obstructions and prevent the free running of the sinker, the latter at the same time being permitted a free swiveling action.

Having thus described my invention, what I claim as new and desire to secure by Letters Patent is:

1. A sinker for fishing tackle, embodying a body portion centrally apertured throughout its length and having an enlarged recess or chamber at its lower end, and a shank passing through said aperture and having a headed lower end lying in said recess or chamber to prevent longitudinal movement, said body portion being freely rotatable on said shank.

2. A sinker for fishing tackle, embodying a body portion centrally apertured throughout its length and having an enlarged recess or chamber at its lower end, and a shank passing through said aperture and having a headed lower end lying in said recess or chamber to prevent longitudinal movement, said shank being formed into a loop at its upper end and coiled upon itself to maintain its position longitudinally, said body portion being freely rotatable on said shank.

3. A sinker for fishing tackle, embodying a body portion centrally apertured throughout its length and having an enlarged recess or chamber at its lower end, a shank passing through said aperture and having a headed lower end lying in said recess or chamber, and a washer in said recess or chamber interposed between said body portion and said headed end of said shank, said body portion being freely rotatable on said shank.

4. A sinker for fishing tackle, embodying a body portion centrally apertured throughout its length and having an enlarged recess or chamber at its lower end, a shank passing through said aperture and having a headed lower end lying in said recess or chamber, and a flanged washer fitted in said recess or chamber and receiving the headed end of said shank, the flange edge of said washer lying flush with the outer surface of the body portion, said body portion being freely rotatable on said shank.

In testimony whereof, I have hereunto set my hand in the presence of two subscribing witnesses.

ERNEST A. PFLUEGER.

Witnesses:
  JENNIE M. CARLSON,
  G. L. A. GALL.